United States Patent
Zhang et al.

(10) Patent No.: US 7,718,155 B2
(45) Date of Patent: *May 18, 2010

(54) CARBON NANOSTRUCTURES MANUFACTURED FROM CATALYTIC TEMPLATING NANOPARTICLES

(75) Inventors: Cheng Zhang, Lawrenceville, NJ (US);
Martin Fransson, Princeton, NJ (US);
Changkun Liu, Lawrenceville, NJ (US);
Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 284 days.

This patent is subject to a terminal disclaimer.

(21) Appl. No.: 11/539,042

(22) Filed: Oct. 5, 2006

(65) Prior Publication Data
US 2007/0265162 A1 Nov. 15, 2007

Related U.S. Application Data

(60) Provisional application No. 60/724,323, filed on Oct. 6, 2005, provisional application No. 60/724,315, filed on Oct. 6, 2005.

(51) Int. Cl.
*C01B 31/00* (2006.01)
*C01B 31/04* (2006.01)
*C09C 1/44* (2006.01)
*C09C 1/46* (2006.01)
*B01J 21/18* (2006.01)

(52) U.S. Cl. ............................ 423/445 R; 423/447.4; 423/447.5; 423/448; 502/180; 502/182

(58) Field of Classification Search ............. 423/445 B, 423/445 R, 447.1, 447.4, 447.5, 447.9, 448; 502/180, 182
See application file for complete search history.

(56) References Cited

U.S. PATENT DOCUMENTS 4,336,238 A 6/1982 Dalton, Jr. et al. .......... 423/584

(Continued)

FOREIGN PATENT DOCUMENTS

EP 1655266 5/2006

(Continued)

OTHER PUBLICATIONS

Hu, et al., "Direct Synthesis of Uniform Hollow Carbon Spheres by a Self-Assembly Template Approach" *The Royal Society of Chemistry 2002*, pp. 1948-1949 (Aug. 1, 2002).

(Continued)

*Primary Examiner*—Scott Kastler
*Assistant Examiner*—Brian Walck
(74) *Attorney, Agent, or Firm*—Workman Nydegger

(57) ABSTRACT

Methods for manufacturing carbon nanostructures include: 1) forming a plurality of catalytic templating particles using a plurality of dispersing agent molecules; 2) forming an intermediate carbon nanostructure by polymerizing a carbon precursor in the presence of the plurality of templating nanoparticles; 3) carbonizing the intermediate carbon nanostructure to form a composite nanostructure; and 4) removing the templating nanoparticles from the composite nanostructure to yield the carbon nanostructures. The carbon nanostructures are well-suited for use as a catalyst support. The carbon nanostructures exhibit high surface area, high porosity, and high graphitization. Carbon nanostructures according to the invention can be used as a substitute for more expensive and likely more fragile carbon nanotubes.

28 Claims, 5 Drawing Sheets

U.S. PATENT DOCUMENTS

| | | |
|---|---|---|
| 4,347,231 A | 8/1982 | Michaelson ............... 423/584 |
| 4,347,232 A | 8/1982 | Michaelson ............... 423/584 |
| 4,374,105 A | 2/1983 | Anderson et al. ........... 423/230 |
| 5,296,543 A | 3/1994 | Kasowski et al. |
| 5,462,680 A | 10/1995 | Brois et al. |
| 5,591,312 A | 1/1997 | Smalley ............... 204/157.41 |
| 5,643,990 A | 7/1997 | Uehara et al. ............. 524/496 |
| 5,830,326 A | 11/1998 | Iijima ..................... 204/173 |
| 5,882,810 A | 3/1999 | Mussell et al. |
| 6,231,980 B1 | 5/2001 | Cohen et al. ............... 428/403 |
| 6,515,845 B1 | 2/2003 | Oh et al. ................... 361/502 |
| 6,551,960 B1 | 4/2003 | Laine et al. ............... 502/327 |
| 6,589,312 B1 | 7/2003 | Snow et al. ................ 75/245 |
| 6,673,953 B2 | 1/2004 | Keller et al. ............... 556/143 |
| 6,683,783 B1 | 1/2004 | Smalley et al. ............. 361/502 |
| 6,689,835 B2 | 2/2004 | Amarasekera et al. ...... 524/495 |
| 6,692,718 B1 | 2/2004 | Osawa ..................... 423/448 |
| 6,712,864 B2 | 3/2004 | Horiuchi et al. ............. 23/314 |
| 6,756,026 B2 | 6/2004 | Colbert et al. |
| 6,835,591 B2 | 12/2004 | Rueckes et al. ............. 438/99 |
| 6,841,509 B1 | 1/2005 | Hwang et al. |
| 6,866,801 B1 | 3/2005 | Mau et al. ................ 264/29.1 |
| 6,936,233 B2 | 8/2005 | Smalley et al. |
| 2002/0192141 A1 | 12/2002 | Little ..................... 423/447.3 |
| 2003/0004058 A1 | 1/2003 | Li et al. .................. 423/447.3 |
| 2003/0100653 A1 | 5/2003 | Chacko ..................... 524/99 |
| 2003/0166762 A1 | 9/2003 | Koevoets et al. ........... 523/351 |
| 2003/0185741 A1 | 10/2003 | Matyjaszewski et al. ... 264/29.2 |
| 2004/0005269 A1 | 1/2004 | Huang et al. ............ 423/447.3 |
| 2004/0047798 A1 | 3/2004 | Oh et al. ................ 423/445 R |
| 2004/0069454 A1 | 4/2004 | Bonsignore et al. |
| 2004/0110005 A1 | 6/2004 | Choi et al. ................ 428/408 |
| 2004/0136894 A1 | 7/2004 | Yoshizawa et al. ......... 524/495 |
| 2004/0141906 A1 | 7/2004 | Polverejan et al. ....... 423/418.2 |
| 2004/0185251 A1 | 9/2004 | Wang et al. ............... 428/689 |
| 2004/0214177 A1 | 10/2004 | Bension ...................... 435/6 |
| 2004/0224163 A1 | 11/2004 | Tobita et al. ............... 428/413 |
| 2004/0234444 A1 | 11/2004 | Shaffer et al. |
| 2005/0009694 A1 | 1/2005 | Watts et al. |
| 2005/0016839 A1 | 1/2005 | Horne et al. ............. 428/248.1 |
| 2005/0032635 A1* | 2/2005 | Yu et al. .................... 502/180 |
| 2005/0037255 A1 | 2/2005 | Ozaki et al. ............... 429/128 |
| 2005/0039382 A1* | 2/2005 | Blanchard et al. ............. 44/362 |
| 2005/0049355 A1 | 3/2005 | Tang et al. ................ 524/496 |
| 2005/0070657 A1 | 3/2005 | Elkovitch et al. ........... 524/495 |
| 2005/0127782 A1 | 6/2005 | Endo et al. ............. 310/323.02 |
| 2005/0128884 A1 | 6/2005 | Endo et al. ................ 368/160 |
| 2005/0170169 A1 | 8/2005 | Watanabe et al. ........ 428/292.1 |
| 2005/0181285 A1 | 8/2005 | Sakamoto et al. |
| 2005/0228109 A1 | 10/2005 | Chandra et al. ............ 524/495 |
| 2005/0245667 A1 | 11/2005 | Harmon et al. ............. 522/116 |
| 2006/0062712 A1 | 3/2006 | Pak et al. |
| 2006/0133981 A1* | 6/2006 | Jaroniec et al. ......... 423/445 R |
| 2006/0137487 A1 | 6/2006 | McKinnon et al. |

FOREIGN PATENT DOCUMENTS

| | | |
|---|---|---|
| JP | 8325504 | 12/1996 |
| JP | 2002338219 | 11/2002 |
| JP | 2003054922 | 2/2003 |
| JP | 2004339041 | 2/2004 |
| JP | 2004224579 | 8/2004 |
| JP | 2004331929 | 11/2004 |
| JP | 2004339407 | 12/2004 |
| JP | 2005074472 | 3/2005 |
| JP | 2005133047 | 5/2005 |
| WO | WO 2004087565 A1 * | 10/2004 |
| WO | WO2005/023708 | 3/2005 |
| WO | WO2005089390 | 9/2005 |

OTHER PUBLICATIONS

Xu, et al., "A Novel Route to Hollow and Solid Carbon Spheres" *Letters to the Editor / Carbon* 43(2005), pp. 1090-1092 (Jan. 6, 2005).

Yoshizawa, et al., "TEM and Electron Tomography Studies of Carbon Nanospheres for Lithium Secondary Batteries" *Science Direct* 44 (2006), pp. 2558-2564 (Jul. 14, 2006).

Wu, et al., "Necklace-like Hollow Carbon Nanospheres from the Pentagon-Including Reactants: Synthesis and Electrochemical Properties" *Inorganic Chemistry*, vol. 45, pp. 8543-8550 (Nov. 21, 2006).

Li, et al., "Carbon Nanotubes as Support for Cathode Catalyst of a Direct Methanol Fuel Cell," *Letters to the Editor/Carbon 40*, Dalian University of Technology, pp. 787-803 (Jan. 18, 2002).

Li, et al., "Preparation and Characterization of Multiwalled Carbon Nanotube-Supported Platinum for Cathode Catalysts of Direct Methanol Fuel Cells," *J. Phys. Chem*, B, vol. 107, pp. 6292-6299 (Jun. 6, 2003).

Lordi, et al., "Method for Supporting Platinum on Single-Walled Carbon Nanotubes for a Selective Hydrogenation Catalyst," *Chem. Mater.*, vol. 13, pp. 733-737 (Feb. 10, 2001).

Ohtsuka, Yasui, et al., "Char-Nitrogen Functionality and Interactions Between the Nitrogen and Iron I the Iron-Catalyzed Conversion Process of Coal Nitrogen to $N_2$," Research Center for Organic Resources and Materials Chemistry, Institute for Chemical Reaction Science, Tohoku University, Sendai, Japan, pp. 1356-1362 (May 6, 1998).

Matsumoto, et al., "Reduction of Pt usage in fuel cell electrocatalysts with carbon nanotube electrodes," *Chem. Commun., The Royal Society of Chemistry* 2004, 2004, pp. 840-841.

Li, et al., "Homogeneous and controllable Pt particles deposited on multi-wall carbon nanotubes as cathode catalyst for direct methanol fuel cells," *Letters to the Editor/Carbon 42*, Dalian University of Technology, pp. 436-439 (2004).

Han, Sangjin, et al., "Simple Solid-Phase Synthesis of Hollow Graphitic Nanoparticles and their Appliation to Direct Methanol Fuel Cell Electrodes," *Adv. Mater.* 2003, 15, No. 22, Nov. 17, pp. 1922-1925.

Hod, Oded, et al., "Carbon nanotube closed-ring structures", *Physical Review*, B 67, 195408 (2003).

Wang, Zhong L., et al., "A rich family of slinky materials," *Materials Today*, Apr. 2004, p. 7.

Zhen Liu, et al., "Formation of nanoparticles rings on heterogeneous soft surfaces," *IOP Electronic Journals*, Nanotechnology, 11 (Nov. 2004).

Bell, Linda, Editor/Publisher, *Nanotech Briefs*, vol. 1, No. 1, (Jan. 2004); www.nanotechbriefs.com.

Drzal, Lawrence T., "Nanotechnology Applications for Green Manufacturing," Michigan State University, College of Engineering, CMSC, Aug. 18, 2004.

Hester, J.R., et al., "Nanoparticle-templated carbon nanotube ring nucleus formation," *Applied Physics Letters*, (Apr. 8, 2002) vol. 80, No. 14, p. 2580-2.

Ibarra, M. R., "Magnetism of Nanometric 3d-Metal Particles in Carbon Cages: Possible Relevance for Biomedical Applications," presentation, Jun. 12, 2003.

Yong, K. Kim, et al., Nanocomposite Fibers, National Textile Center Annual Report: Nov. 2003; pp. 1-9.

Developing Application in Plastics, Nanotubes as a Conductive Additive in Elastomers; Hyperion Catalysis; hppt://www.fibrils.com/developing2.htm.

Max Planck Research, Spicing up Styrene with Nano-Onions; Jan. 2003.

Bagci, V.M.K., "Metal nanoring and tube formation on carbon nanotubes", Dept. of Phys., Bilkent Univ., Ankara, Turkey.

Kuznetsova, A., et al., Physical adsorption of xenon in open single walled carbon nanotubes: Observation of a quasi-one-dimensional confined Xe phase, Journal of Chemical Physics, vol. 112, No. 21, 9590-9598, Jun. 1, 2000.

Mawhinney, Douglas B., et al., "Infared Spectral Evidence for the Etching of Carbon Nanotubes: Ozone Oxidation at 298 K", J. Am. Chem. Soc. (2000), 122, 2383-2384, published on web Feb. 29, 2000.

Kuznetsova, A, et al., "Enhancement of adsorption inside of single-walled nanotubes: opening the entry ports", Chemical Physics Letters 321, (2000), 292-296.

Kuznetsova, A., et al., "Oxygen-Containing Functional Groups on Single-Wall Carbon Nanotubes: NEXAFS and Vibrational Spectroscopic Studies", J. Am. Chem. Soc. (2001), 123, 10699-10704, published on web Oct. 9, 2001.

Fuertes, Antonio B. and Centeno, Teresa A., "Mesoporous carbons with graphitic structures fabricated by using porous silica materials as templates and iron-impregnated polypyrrole as precursor", J. Mater. Chem, (2005), 15, 1079-1083.

Guozhang, W., et al., "Entropy Penalty-Induced Self-Assembly in Carbon Black or Carbon Fiber Filled Polymer Blends", Macromolecules, (2002), vol. 35, No. 3, 945-951, published on the web Dec. 29, 2001.

Simonyam, Vahan V. and Johnson, J. Karl, "Hydrogen storage in carbon nanotubes and graphitic nanofibers", Journal of Alloys and Compounds, 330-332, (2002), 659-665.

Carmona, François and Ravier, Jérôme, "Electrical properties and mesostructure of carbon black-filled polymers", Pergamon, Carbon 40, (2002), 151-156.

Behler, K., et al., "Effect of thermal treatment on the structure of multi-walled carbon nanotubes", Journal of Nanoparticle Research, (2006), DOI 10/1007/s11051-006-9113-6.

Sun et al., "Colloidal Carbon Spheres and Their Core/Shell Structures with Noble-Metal Nanoparticles", Angewandte Chemie International Edition, WILEY-VCH Verlag GmbH & Co. KGaA, 2004, vol. 43, Issue 5, pp. 597-6501.

Qiao et al., "Carbon nanospheres produced in an arc-discharge process", Carbon 44 (2006) 158-193, available online Sep. 13, 2005.

Garrigue et al., "Top-Down Approach for the Preparation of Colloidal Carbon Nanoparticles", Chemical Materials 2004, 16, 2984-2986, available online Jul. 17, 2007.

Mukhopadhyay, Kingsuk, "Bulk Production of quasi aligned carbon nanotube bundles by the catalytic chemical vapour deposition (ccvd) method", Apr. 2, 1999, Chemical Physics Letters, vol. 303, pp. 117-12.

T. Hyeon et al., Angew. Chem, Int. Ed. 2003, 42, 4352-4356.

Office Action dated Jan. 1, 2009 cited in U.S. Appl. No. 11/244,521.

Office Action dated Nov. 12, 2008 cited in U.S. Appl. No. 11/539,120.

Office Action dated Apr. 8, 2009 cited in U.S. Appl. No. 11/539,120.

* cited by examiner

CARBON NANOSTRUCTURES MANUFACTURED FROM CATALYTIC TEMPLATING NANOPARTICLES

CROSS-REFERENCE TO RELATED APPLICATION

This application claims the benefit under 35 U.S.C. §119 of U.S. provisional application Ser. No. 60/724,323, filed Oct. 6, 2005, and also of U.S. provisional application Ser. No. 60/724,315, filed Oct. 6, 2005, the disclosures of which are incorporated herein in their entirety.

BACKGROUND OF THE INVENTION

1. The Field of the Invention

The present invention relates generally to carbon nanomaterials. More particularly, the present invention relates to carbon nanostructures that are manufactured using a carbon precursor and a catalytic templating particle.

2. The Related Technology

Carbon materials have been used in a variety of fields as high-performance and functional materials. Pyrolysis of organic compounds is well-known to be one of the most useful methods to prepare carbon materials. For example, carbon materials can be produced by pyrolyzing resorcinol-formaldehyde gel at temperatures above 600° C.

Most carbon materials obtained by pyrolysis of organic compounds at temperatures between 600-1400° C. tend to be amorphous or have a disordered structure. Obtaining highly crystalline or graphitic carbon materials can be very advantageous because of the unique properties exhibited by graphite. For example, graphitic materials can be conductive and form unique nanomaterials such as carbon nanotubes. However, using existing methods it is difficult to make these well-crystallized graphite structures using pyrolysis, especially at temperatures less than 2000° C.

To acquire the graphite structure at lower temperature many studies have been carried out on carbonization in the presence of a metal catalyst. The catalyst is typically a salt of iron, nickel, or cobalt that is mixed with carbon precursor. Using catalytic graphitization, graphitic materials can be manufactured at temperatures between 600° C. and 1400° C. Most catalytic graphitization methods have focused on making graphite nanotubes. However, the yield of crystalline materials is still very low (e.g., for carbon nanotubes the yield is less than 2%). These low yields make it difficult to use the nanomaterials in making useful articles.

BRIEF SUMMARY OF THE INVENTION

The present invention relates to novel methods for manufacturing carbon nanostructures using a carbon precursor and a catalyst. The carbon nanostructures are formed around a plurality of templating nanoparticles. In an exemplary embodiment, the templating nanoparticles are manufactured from catalytic metal atoms using an organic dispersing agent. The catalytic nanoparticles advantageously function both as a nucleating site for carbon nanostructure formation and as a catalyst during carbonization and/or polymerization of the carbon precursor.

The novel methods of making carbon nanostructures according to the present invention can include all or a portion of the following steps:

(i) forming a plurality of catalytic templating nanoparticles by:
  (a) reacting a plurality of precursor catalyst atoms with a plurality of organic dispersing agent molecules to form complexed catalyst atoms; and
  (b) allowing or causing the complexed catalyst atoms to form the templating nanoparticles;
(ii) forming one or more intermediate carbon nanostructures by polymerizing a carbon precursor in the presence of the templating nanoparticles;
(iii) carbonizing the intermediate carbon nanostructures to form a plurality of composite nanostructures; and
(iv) removing the templating nanoparticles from the composite nanostructures to yield the carbon nanostructures.

In the method of the present invention, the dispersed templating nanoparticles are formed using a dispersing agent. The dispersing agent is an organic molecule that includes one or more functional groups that can bond with the catalyst atoms. In a preferred embodiment, the one or more functional groups comprise a hydroxyl, a carboxyl, a carbonyl, an amine, an amide, a nitrile, a nitrogen with a free lone pair of electrons, an amino acid, a thiol, a sulfonic acid, a sulfonyl halide, an acyl halide, or a combination of any of these. The dispersing agent molecules bond with the catalyst atoms to form a complex. The complexed catalyst atoms then react or agglomerate to form solid catalytic templating particles. The organic dispersing agent can control the formation, size, and/or dispersion of the catalytic templating nanoparticles.

In the method of the present invention, the catalytic templating nanoparticles are used as a template for making the nanostructures. When mixed with the carbon precursor, the templating nanoparticles provide a nucleation site where carbonization and/or polymerization can begin or be enhanced. Because the templating nanoparticles are made from catalytic atoms, the templating particles can advantageously serve as both a nucleating site and as a catalyst for carbonization and/or polymerization. This feature of the invention eliminates the need to add templating particles and catalyst separately (e.g., silica sol and metal salts). In this manner solid catalytic templating particles avoid the situation where the separately added catalyst atoms undesirably act as a nucleation site. The catalytic templating nanoparticles of the present invention can advantageously produce carbon nanostructures having more uniform features (e.g., inner hole diameter) than carbon nanostructures manufactured using existing methods.

In an exemplary embodiment, the method of the present invention produces carbon nanostructures having a ring shape. The ring shape can give the carbon nanostructures beneficial properties such as high porosity and high surface area. Beneficial features such as these make the carbon nanostructures useful as a support material for a fuel cell catalyst. The high surface area allows for high metal loadings while the high porosity improves the performance of the fuel cell catalyst due to improved diffusion of reactants. Their high electrical conductivity allows the nanostructures to be used in the anode or the cathode of a fuel cell. Carbon nanostructures can be substituted for carbon nanotubes, which are typically more expensive and likely more fragile.

These and other advantages and features of the present invention will become more fully apparent from the following description and appended claims as set forth below.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

I. Introduction and Definitions

Figure 1A:
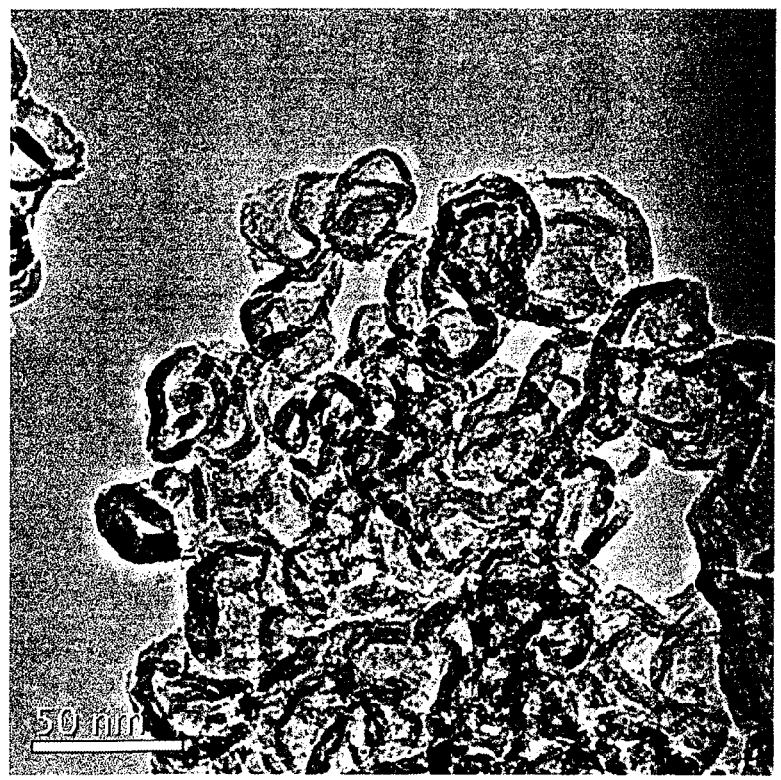
FIG. 1A is a high resolution TEM image of a plurality of carbon nanostructures formed according to an exemplary embodiment of the present invention.
Figure 1B:
FIG. 1B is a high resolution TEM image showing a close-up of various carbon nanostructures of FIG. 1A.
Figure 1C:
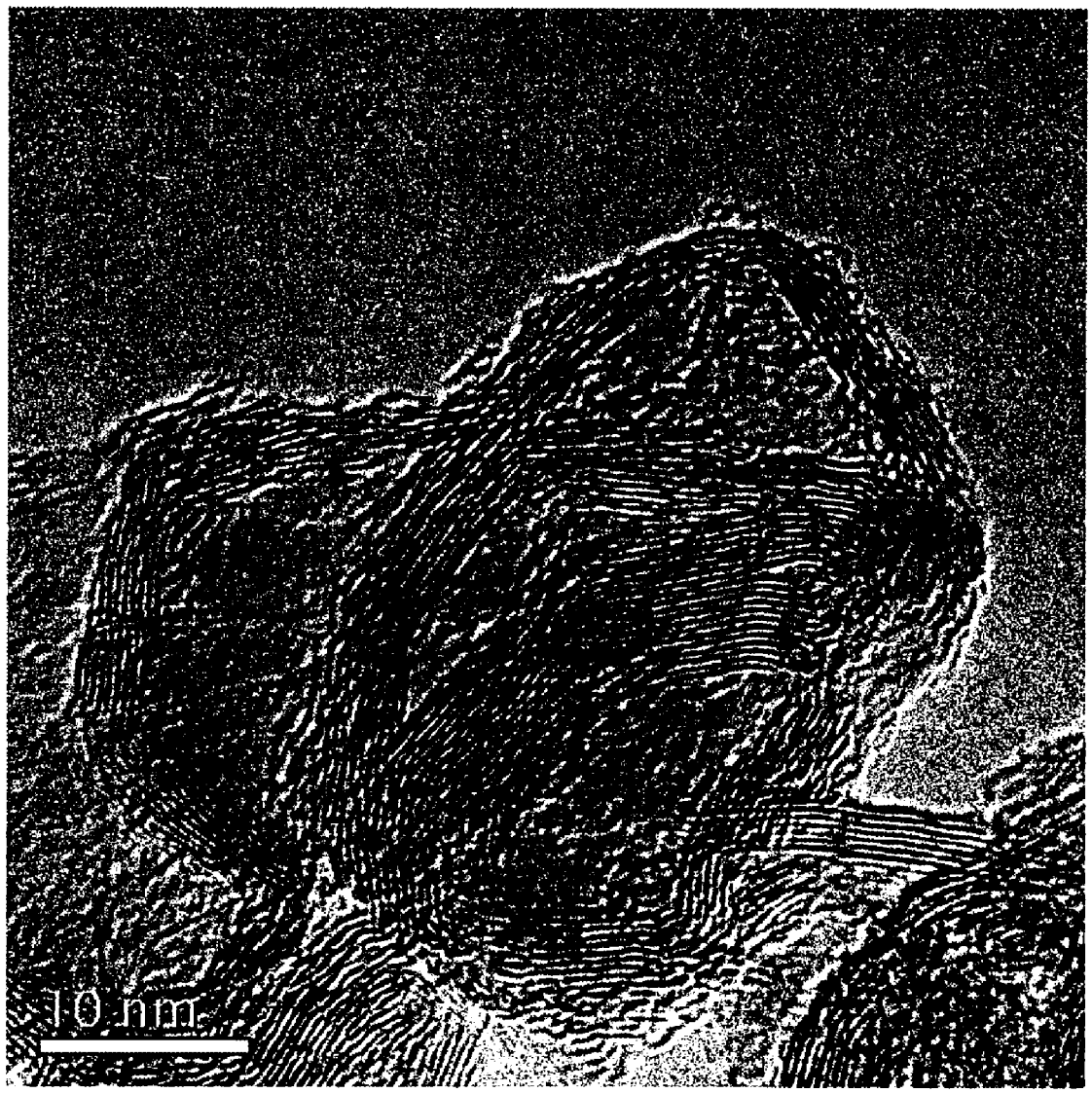
FIG. 1C is a high resolution TEM image showing yet a closer image of a carbon nanostructure of FIG. 1A.
Figure 2A:
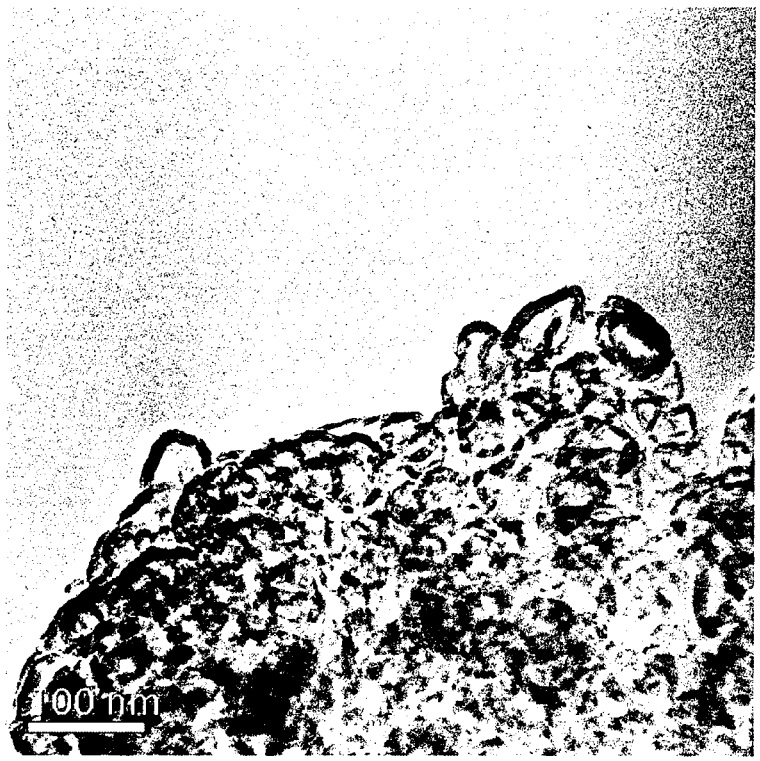
FIG. 2A is a high resolution TEM image of a plurality of carbon nanostructures formed according to an exemplary embodiment of the present invention.
Figure 2B:
FIG. 2B is a high resolution TEM image showing a closer image of various carbon nanostructures of FIG. 2A.
Figure 3A:
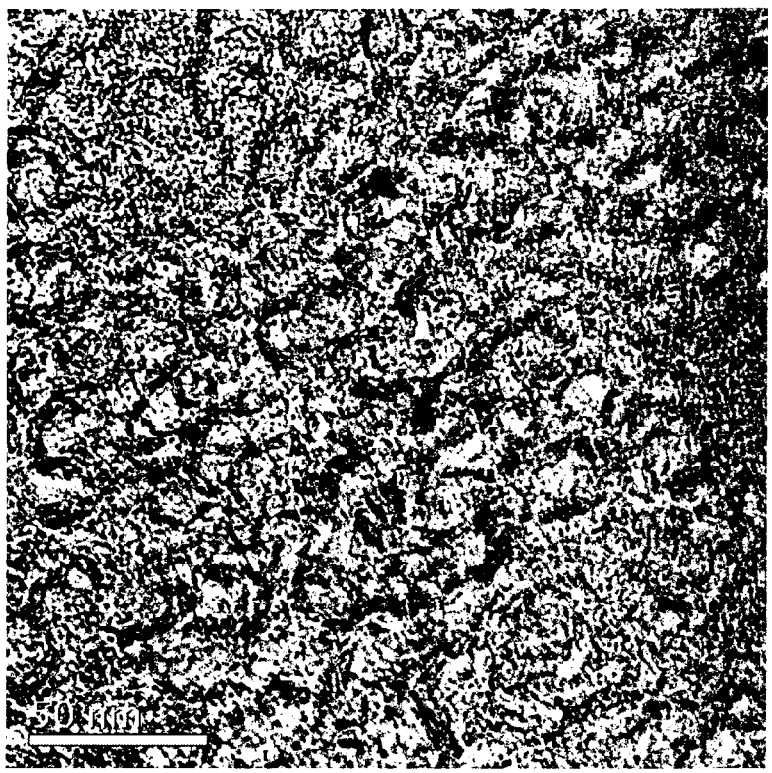
FIG. 3A is a high resolution TEM image of a plurality of carbon nanostructures formed according to an exemplary embodiment of the present invention.
Figure 3B:
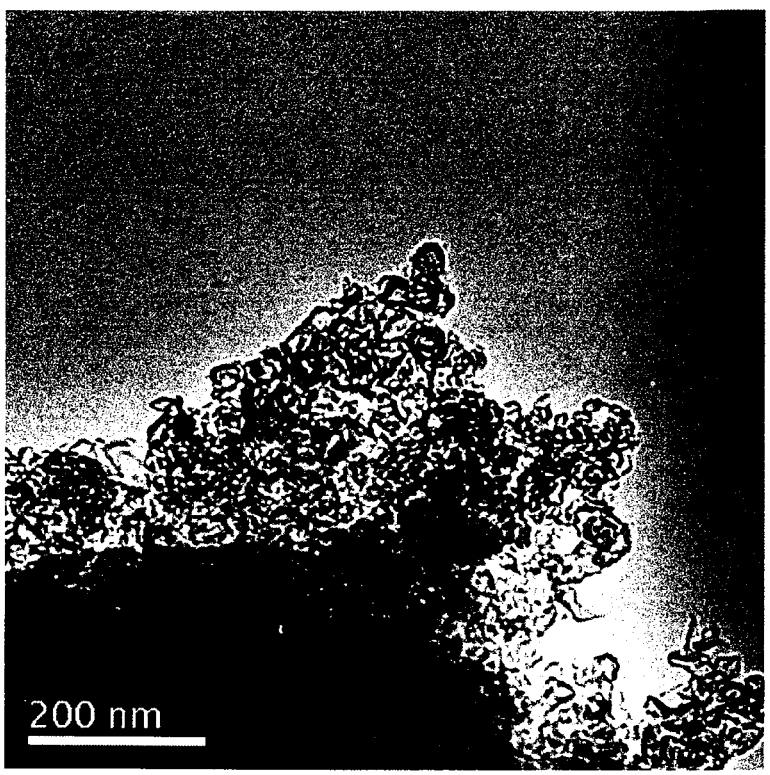
FIG. 3B is a high resolution TEM image showing a closer image of various carbon nanostructures of FIG. 3A.

The present invention is directed to methods of making carbon nanostructures and the use of the carbon nanostructures as catalyst supports (e.g., for fuel cell catalysts). Methods for manufacturing carbon nanostructures generally include 1) forming a plurality of solid catalytic templating particles by reacting catalyst atoms with an organic dispersing agent, 2) forming intermediate carbon nanostructures by polymerizing a carbon precursor in the presence of the templating nanoparticles, 3) carbonizing the intermediate carbon nanostructures to form composite nanostructures, and 4) removing the templating nanoparticles from the composite nanostructures to leave carbon nanostructures. The carbon nanostructures manufactured using the foregoing steps have one or more carbon layers forming a wall that generally appears to define a carbon nanoring or truncated tube-like structure when viewed as TEM images but which might be characterized as hollow but irregular multi-walled sphere-like (or spheroidal) nanostructures when the TEM images are analyzed in combination with SEM images of the same material. In one embodiment, the carbon nanostructures form clusters of grape-like structures as seen in SEM images but which are known to be hollow multi-walled nanostructures as shown by TEM images of the same material.

For purposes of the present invention, a precursor catalyst material is any material that can appreciably increase the rate of carbonization of the carbon precursor when combined therewith. Non-limiting examples of precursor catalyst materials include iron, cobalt, and/or nickel.

Solid catalyst templating particles are particles where substantially all of the templating particle are made from one or more catalytic materials.

II. Components Used to Manufacture Carbon Nanostructures

The following exemplary components can be used to carry out the above mentioned steps for manufacturing carbon nanostructures according to the present invention.

A. Polymerizable Carbon Precursor

Any type of carbon material can be used as the carbon precursor of the present invention so long as it can disperse the templating particles, polymerize to form an intermediate nanostructure, and become carbonized by heat-treatment. Suitable compounds include single and multi-ring aromatic compounds such as benzene and naphthalene derivatives that have polymerizable functional groups. Also included are ring compounds that can form single and multi-ring aromatic compounds upon heating. Functional groups that can participate in polymerization include COOH, C=O, OH, C=C, $SO_3$, $NH_2$, SOH, N=C=O, and the like.

The polymerizable carbon precursor can be a single type of molecule (e.g., a compound that can polymerize with itself), or the polymerizable carbon precursor can be a combination of two or more different compounds that co-polymerize together. For example, in an exemplary embodiment, the carbon precursor can be a resorcinol-formaldehyde gel. In this two compound embodiment, the formaldehyde acts as a cross-linking agent between resorcinol molecules by polymerizing with the hydroxyl groups of the resorcinol molecules.

Other examples of suitable polymerizable precursor materials include resorcinol, phenol resin, melamine-formaldehyde gel, poly(furfuryl alcohol), poly(acrylonitrile), sucrose, petroleum pitch, and the like. Other polymerizable benzenes, quinones, and similar compounds can also be used as carbon precursors and are known to those skilled in the art.

In an exemplary embodiment, the carbon precursor is a hydrothermally polymerizable organic compound. Suitable organic compounds of this type include citric acid, acrylic acid, benzoic acid, acrylic ester, butadiene, styrene, cinnamic acid, and the like.

B. Catalytic Templating Nanoparticles

As described below, the formation of the catalytic templating particles generally includes reacting a plurality of templating catalyst atoms with a plurality of dispersing agent molecules in a solvent to form complexed catalyst atoms. The complexed catalyst atoms then react to form nanoparticles.

1. Carbon Precursor Catalyst Atoms

The precursor catalyst atom can be any material that can cause or promote carbonization and/or polymerization of the carbon precursor. In a preferred embodiment, the catalyst is a transition metal catalyst including but not limited to iron, cobalt, or nickel. These transition metal catalysts are particularly useful for catalyzing many of the polymerization and/or carbonization reactions involving the carbon precursors described above.

2. Dispersing Agents

In addition to catalyst atoms, the catalyst complexes of the present invention include one or more dispersing agents. The dispersing agent is selected to promote the formation of nanocatalyst particles that have a desired stability, size and/or uniformity. Dispersing agents within the scope of the invention include a variety of small organic molecules, polymers and oligomers. The dispersing agent is able to interact and bond with catalyst atoms dissolved or dispersed within an appropriate solvent or carrier through various mechanisms, including ionic bonding, covalent bonding, Van der Waals interaction/bonding, lone pair electron bonding, or hydrogen bonding.

To provide the bonding between the dispersing agent and the catalyst atoms, the dispersing agent includes one or more appropriate functional groups. Preferred dispersing agents include functional groups which have either a charge or one or more lone pairs of electrons that can be used to complex a metal catalyst atom, or which can form other types of bonding such as hydrogen bonding. These functional groups allow the dispersing agent to have a strong binding interaction with the catalyst atoms.

The dispersing agent may be a natural or synthetic compound. In the case where the catalyst atoms are metal and the dispersing agent is an organic compound, the catalyst complex so formed may be an organometallic complex.

In an exemplary embodiment, the functional groups of the dispersing agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, or an acyl halide. The dispersing agent can be monofunctional, bifunctional, or polyfunctional.

Examples of suitable monofunctional dispersing agents include alcohols such as ethanol and propanol and carboxylic acids such as formic acid and acetic acid. Useful bifunctional dispersing agents include diacids such as oxalic acid, malic acid, malonic acid, maleic acid, succinic acid, and the like; dialcohols such as ethylene glycol, propylene glycol, 1,3-propanediol, and the like; hydroxy acids such as glycolic acid, lactic acid, and the like. Useful polyfunctional dispersing agents include sugars such as glucose, polyfunctional carboxylic acids such as citric acid, pectins, cellulose, and the like. Other useful dispersing agents include ethanolamine, mercaptoethanol, 2-mercaptoacetate, amino acids, such as glycine, and sulfonic acids, such as sulfobenzyl alcohol, sulfobenzoic acid, sulfobenzyl thiol, and sulfobenzyl amine. The dispersing agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

In addition to the characteristics of the dispersing agent, it can also be advantageous to control the molar ratio of dispersing agent to the catalyst atoms in a catalyst suspension. A more useful measurement is the molar ratio between dispersing agent functional groups and catalyst atoms. For example, in the case of a divalent metal ion two molar equivalents of a monovalent functional group would be necessary to provide the theoretical stoichiometric ratio. In a preferred embodiment, the molar ratio of dispersing agent functional groups to catalyst atoms is preferably in a range of about 0.01:1 to about 100:1, more preferably in a range of about 0.05:1 to about 50:1, and most preferably in a range of about 0.1:1 to 20:1.

The dispersing agents of the present invention allow for the formation of very small and uniform nanoparticles. In general, the nanocatalyst particles formed in the presence of the dispersing agent are less than 1 micron in size. Preferably the nanoparticles are less than 100 nm, more preferably less than 50 nm and most preferably less than 20 nm.

During pyrolysis of the carbon precursor, the dispersing agent can inhibit agglomeration and deactivation of the catalyst particles. This ability to inhibit deactivation can increase the temperature at which the nanocatalysts can perform and/or increase the useful life of the nanocatalyst in the extreme conditions of pyrolysis. Even if including the dispersing agent only preserves catalytic activity for a few additional milliseconds, or even microseconds, the increased duration of the nanocatalyst can be very beneficial at high temperatures, given the dynamics of carbonization.

3. Solvents and Other Additives

The liquid medium in which the catalytic templating nanoparticles are prepared may contain various solvents, including water and organic solvents. Solvents participate in particle formation by providing a liquid medium for the interaction of catalyst atoms and dispersing agent. In some cases, the solvent may act as a secondary dispersing agent in combination with a primary dispersing agent that is not acting as a solvent. In one embodiment, the solvent also allows the nanoparticles to form a suspension. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

The catalyst composition can also include additives to assist in the formation of the nanocatalyst particles. For example, mineral acids and basic compounds can be added, preferably in small quantities (e.g., less than 5 wt %). Examples of mineral acids that can be used include hydrochloric acid, nitric acid, sulfuric acid, phosphoric acid, and the like. Examples of basic compounds include sodium hydroxide, potassium hydroxide, calcium hydroxide, ammonium hydroxide, and similar compounds.

It is also possible to add solid materials to assist in nanoparticle formation. For example, ion exchange resins may be added to the solution during catalyst formation. Ion exchange resins can be substituted for the acids or bases mentioned above. Solid materials can be easy separated from the final iron catalyst solution or suspension using simple techniques such as centrifugation and filtration.

III. Manufacturing Carbon Nanostructures

The carbon nanostructures of the present invention can be manufactured using all or a portion of the following steps: (i) forming a plurality of dispersed catalytic templating nanoparticles by reacting a plurality of precursor catalyst atoms with a plurality of dispersing agent molecules, (ii) mixing the plurality of catalytic templating nanoparticles (e.g., iron particles) with a carbon precursor (e.g., citric acid) and allowing or causing the carbon precursor to polymerize to form a plurality of intermediate nanostructures, (iii) carbonizing the intermediate nanostructures to form a plurality of composite nanostructures, and (iv) removing the templating nanoparticles from the plurality of composite nanostructures to yield the carbon nanostructures.

A. Providing Catalytic Templating Nanoparticles

The process for manufacturing the nanoparticles can be broadly summarized as follows. First, one or more types of precursor catalyst atoms and one or more types of dispersing agents are selected. Second, the precursor catalyst atoms (e.g., in the form of a ground state metal or metal salt) and dispersing agent (e.g., in the form of a carboxylic acid or its salt) are reacted or combined together to form catalyst complexes. The catalyst complexes are generally formed by first dissolving the catalyst atoms and dispersing agent in an appropriate solvent and then allowing the catalyst atoms to bond with the dispersing agent molecules. The various components may be combined or mixed in any sequence or combination. In addition, a subset of the components can be premixed prior to addition of other components, or all components may be simultaneously combined.

In one aspect of the invention, the catalyst complexes may be considered to be the complexed catalyst atoms and dispersing agent, exclusive of the surrounding solvent. Indeed, it is within the scope of the invention to create catalyst complexes in a solution and then remove the solvent to yield dried catalyst complexes. The dried catalyst complexes can be reconstituted by adding an appropriate solvent.

In an exemplary embodiment, the components are mixed for a period of about 1 hour to about 14 days. This mixing is typically conducted at temperatures ranging from 0° C. to 200° C. Preferably the temperature does not exceed 100° C.

The precursor catalyst atoms are typically provided in the form of an iron salt such as iron chloride, iron nitrate, iron sulfate, or the like. These compounds are often soluble in an aqueous solvent. Formation of the catalyst nanoparticles using metal salts can lead to the formation of additional by-products from the release of the anion. If desired, formation of an anion can be avoided by using a metal powder (e.g., iron). Typically the only significant by-product of the catalyst preparation using iron metal is hydrogen gas, which is evolved during the mixing procedure. If the catalyst particles are made using a material that evolves hydrogen gas or another gas, the mixture is typically vented and/or exposed to air periodically (or continuously) during the preparation procedure.

In an exemplary embodiment, the nanocatalyst particles are in an active form once the mixing step is complete or upon further reduction using hydrogen, for example. In a preferred embodiment, the nanocatalyst particles are formed as a suspension of stable active metal nanocatalyst particles. The stability of the nanocatalyst particles prevents the particles from agglomerating together and maintains them in suspension. Even where some or all of the nanocatalyst particles settle out of solution over time, the nanocatalyst particles can be easily re-suspended by mixing.

A base can be added (e.g., concentrated aqueous ammonia) to adjust the pH of the solution to between about 8 and about 13, and more preferably between about 10 and about 11. The higher pH can be useful for precipitating the precursor catalyst atoms in a finely divided manner.

The catalytic templating nanoparticles are capable of catalyzing polymerization and/or carbonization of the carbon precursor. The foregoing procedure for preparing the catalytic templating particles can assist in arranging the catalyst atoms into particles that are catalytically active. In contrast, the inventors have found that some commercially available reagents (e.g., at least one commercially available iron citrate) do not have satisfactory catalytic activity.

B. Polymerizing the Carbon Precursor

The catalytic templating nanoparticles are mixed with a carbon precursor (e.g., citric acid) under conditions suitable for the carbon precursor to polymerize around the templating nanoparticles. Because the templating nanoparticles are catalytically active, the templating nanoparticles can preferentially accelerate and/or initiate polymerization of the carbon precursor near the surface of the templating particles.

The concentration of catalytic templating nanoparticles in the carbon precursor is typically selected to maximize the number of carbon nanostructures formed while still producing uniformly shaped nanostructures. The amount of catalytic templating particles can vary depending on the type of carbon precursor being used. In an exemplary embodiment the molar ratio of carbon precursor to catalyst atoms is about 0.1:1 to about 100:1, more preferably about 1:1 to about 30:1.

The precursor composition is allowed to cure for sufficient time such that a plurality of intermediate carbon nanostructures are formed around the templating nanoparticles. The time needed to form intermediate nanostructures depends on the temperature, the type and concentration of the catalyst material, the pH of the solution, and the type of carbon precursor being used. During polymerization, the intermediate carbon nanostructures can be individual organic structures or an association of nanostructures that break apart during carbonization and/or removal of amorphous carbon.

Ammonia added to adjust the pH can also effect polymerization by increasing the rate of polymerization and by increasing the amount of cross linking that occurs between precursor molecules.

For hydrothermally polymerizable carbon precursors, polymerization typically occurs at elevated temperatures. In a preferred embodiment, the carbon precursor is heated to a temperature of about 0° C. to about 200° C., and more preferably between about 25° C. to about 120° C.

An example of a suitable condition for polymerization of resorcinol-formaldehyde gel (e.g., with iron particles and a solution pH of 1-14) is a solution temperature between 0° C. and 90° C. and a cure time of less than 1 hour to about 72 hours. Those skilled in the art can readily determine the conditions necessary to cure other carbon precursors under the same or different parameters.

In an exemplary embodiment the polymerization is not allowed to continue to completion. Terminating the curing process before the entire solution is polymerized can help to form a plurality of intermediate nanostructures that will result in individual nanostructures, rather than a single mass of carbonized material. However, the present invention includes embodiments where the carbon precursor forms a plurality of intermediate carbon nanostructures that are linked or partially linked to one another. In this embodiment, individual nanostructures are formed during carbonization and/or during the removal of amorphous carbon.

Forming intermediate carbon nanostructures from the dispersion of templating nanoparticles causes formation of a plurality of intermediate carbon nanostructures having unique shapes and sizes. Ultimately, the properties of the nanostructure depend at least in part on the shape and size of the intermediate carbon nanostructure. Because of the unique shapes and sizes of the intermediate carbon nanostructures, the final nanostructures can have beneficial properties such as high surface area and high porosity, among others.

C. Carbonizing the Intermediate Nanostructures

Once the intermediate nanostructures are obtained, they are carbonized by heating to produce carbonized composite nanostructures. In an exemplary embodiment, the intermediate nanostructures are heated to a temperature between about 500° C. and about 2500° C. During the heating process, atoms such as oxygen and nitrogen are volatilized or otherwise removed from the intermediate nanostructure and the carbon atoms are rearranged or coalesced to form a carbon-based structure.

In a preferred embodiment, the carbonizing step produces a graphite based nanostructure. The graphite based nanostructure has carbon atoms arranged in sheets of $sp^2$ hybridized carbon atoms. The graphitic layers can provide unique and beneficial properties, such as electrical conduction and structural strength and/or rigidity.

D. Removing the Templating Nanoparticles and/or Amorphous Carbon to Yield Carbon Nanostructures In a final step, the templating nanoparticles and/or extraneous amorphous (i.e., non-graphitic) carbon are removed from the composite nanostructures. Typically, the templating nanoparticles are removed using acids or bases such as nitric acid, hydrogen fluoride, or sodium hydroxide. The method of removing the templating nanoparticles or amorphous carbon depends on the type of templating nanoparticle or catalyst atoms in the composite. Catalyst atoms or particles (e.g., iron particles or atoms) can typically be removed by refluxing the composite nanostructures in 5.0 M nitric acid solution for about 3-6 hours.

Any removal process can be used to remove the templating nanoparticles and/or amorphous carbon so long as the removal process does not completely destroy the carbon nanospheroidal and/or nanoring structure. In some cases it can be beneficial to at least partially remove some of the carbonaceous material from the intermediate nanostructure during the removal process. It is not presently known at what point in the method that the annular shape is formed, whether it is during the polymerization step, carbonation step, or nanoparticle removal step.

IV. Carbon Nanostructures

The methods of the present invention produce a multi-walled carbon nanostructure having useful properties such as unique shape, size, and electrical properties. In a preferred embodiment, the carbon nanostructures can be a regular or irregularly shaped annular structure having a hole therethrough (i.e., a nanoring or hollow multi-walled, sphere-like or spheroidal structure). The carbon nanostructures of the present invention are particularly advantageous for some applications where high porosity, high surface area, and/or a high degree of graphitization are desired. Carbon nanostructures manufactured as set forth herein can be substituted for carbon nanotubes, which are typically far more expensive.

The size of the nanostructure is determined in large part by the size of the templating nanoparticles used to manufacture the carbon nanostructures. Because the carbon nanostructures form around the templating nanoparticles, the hole or inner diameter of the carbon nanostructures typically corresponds to the outer diameter of the templating nanoparticles. The inner diameter of the carbon nanostructures can be between 0.5 nm to about 90 nm. For certain applications such as fuel cells, the inner diameter is preferably between about 1 nm and about 50 nm.

Figure 4A:
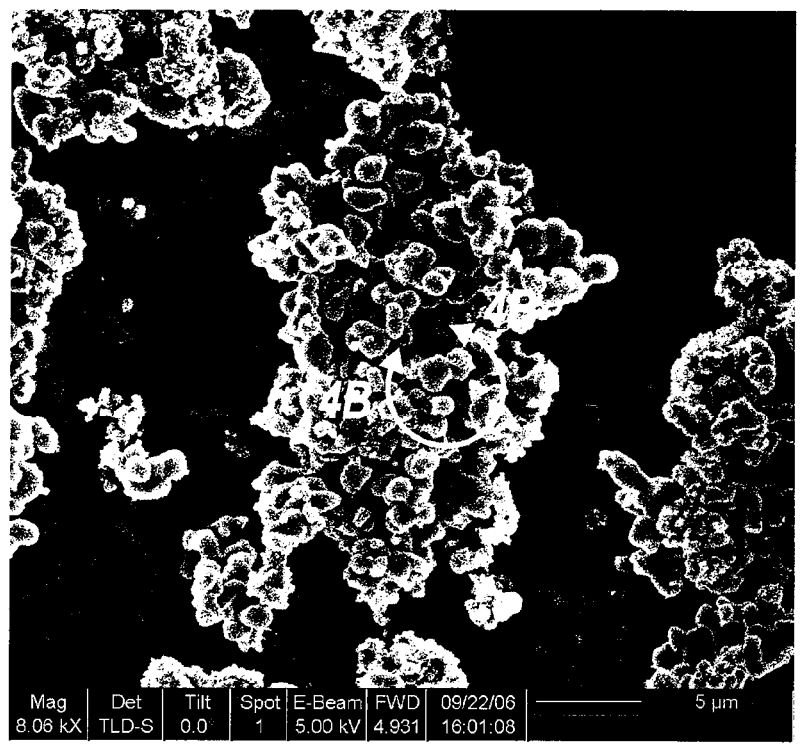
FIG. 4A is a high resolution SEM image of carbon nanostructures formed according to an exemplary embodiment of the present invention showing them to be sphere-like in shape.
Figure 4B:
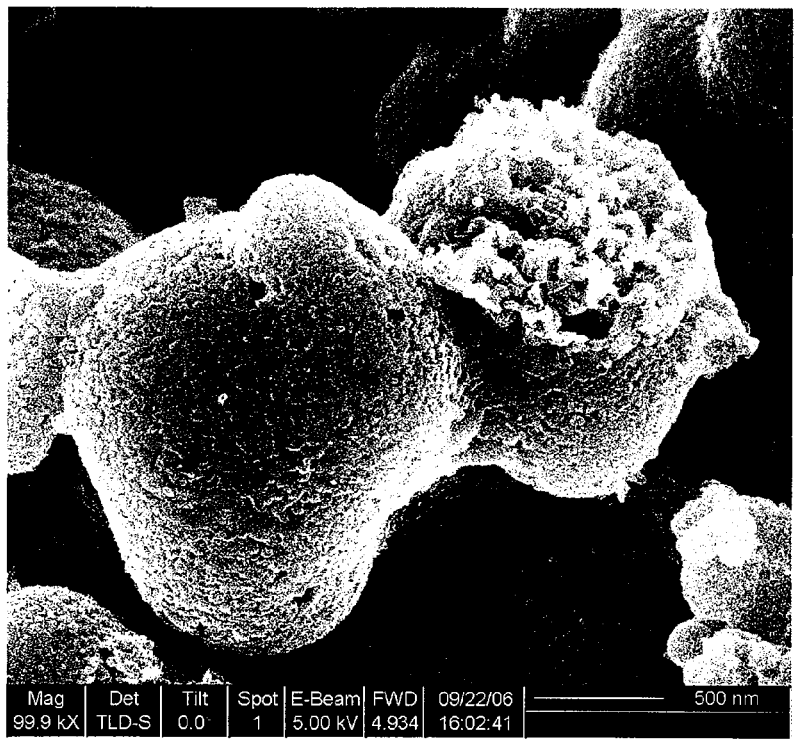
FIG. 4B is a high resolution SEM image showing a closer image of various carbon nanostructures of FIG. 4A.

FIGS. 1A-1C, 2A-2B, and 3A-3B show TEM images of exemplary carbon nanostructures made according to the methods of the present invention, the details of which are described in Example 1 below. FIGS. 4A-4B show SEM images of exemplary nanostructures made according to the present invention, the details of which are described in Example 1 below.

The generally annular shape of the carbon nanostructures is shown in the TEM images of FIGS. 1A-1C, 2A-2B, and 3A-3B. The generally sphere-like shape of the carbon nanostructures is shown in the SEM images of FIGS. 4A-4B. In many of the carbon nanostructures shown in the TEM images, the outer ring diameter is between about 10 nm and about 60 nm and the pore size is about 10 nm to about 40 nm. However, the present invention includes nanostructures having larger and smaller diameters. Typically, the carbon nanostructures have an outer diameter that is less than about 100 nm to maintain structural integrity.

The thickness of the nanostructure wall is measured from the inside diameter of the wall to the outside diameter of the wall. The thickness of the nanostructure can be varied during manufacture by limiting the extent of polymerization and/or carbonization of the carbon precursor as described above. Typically, the thickness of the carbon nanostructure wall is between about 1 nm and 20 nm. However, thicker and thinner walls can be made if desired. The advantage of making a thicker wall is greater structural integrity. The advantage of making a thinner wall is greater surface area and porosity.

The wall of the carbon nanostructure can also be formed from multiple graphitic layers. The TEM images in FIGS. 1A, 1B, and 1C clearly shows multiple layers. In an exemplary embodiment, the carbon nanostructures have walls of between about 2 and about 100 graphite layers, more preferably between about 5 and 50 graphite layers and more preferably between about 5 and 20 graphite layers. The number of graphitic layers can be varied by varying the thickness of the carbon nanostructure wall as discussed above. The graphitic characteristic of the carbon nanostructures is believed to give the carbon nanostructures beneficial properties that are similar to the benefits of multi-walled carbon nanotubes (e.g., excellent conductivity). They can be substituted for carbon nanotubes and used in virtually any application where carbon nanotubes can be used but often with predictably superior results.

The carbon nanostructures also have a desired length. The length of the carbon nanostructure is the length of the hole as measure along the axis of the hole. If the carbon nanostructure is lying flat or horizontal, the length of the carbon nanostructure is the height of the carbon nanostructure. In a preferred embodiment, the length of the carbon nanostructure is limited by forming the carbon nanostructures from substantially spherical templating nanoparticles. Carbon nanostructures formed from spherical templating nanoparticles typically only have a length that is approximately the same as the outer diameter of the carbon nanostructure. Such a result can be obtained because of the substantially even polymerization and/or carbonization about the templating nanoparticle. With regard to what appear to be carbon nanorings in the TEM images, the length typically does not exceed the outer diameter of the carbon nanoring because the length and the outer diameter typically grow at substantially the same rate during polymerization. Carbon nanostructures that have a length that is less than or about equal to the outer diameter can be advantageous because of their large surface area and/or because they can better facilitate diffusion of reactants and reaction products as compared to, e.g., carbon nanotubes.

Another feature of the carbon nanostructures of the present invention is the formation of a non-tubular wall. As shown in the TEM images of FIGS. 1A, 1B, and 1C, and also the SEM images of FIGS. 4A and 4B, the graphitic layers form a substantially solid wall. This is in contrast to attempts by others to make a carbon nanostructure where the ends of a carbon nanotube are connected to make a ring. Carbon nanostructures having tubular walls create undesirable strain that can affect structural integrity and other properties of the nanostructure. For example, reports in the literature suggest that kinks in the ring shaped nanotubes prevent formation of carbon nanostructures smaller than 70 nm in diameter. In any event, the terms "carbon nanoring" and "carbon nanostructures" shall exclude ring-like structures formed by joining opposite ends of a carbon nanotube.

In addition to good electron transfer, the carbon nanostructures of the present invention have high porosity and large surface areas. Adsorption and desorption isotherms indicate that the carbon nanostructures form a mesoporous material. The BET specific surface area of the carbon nanostructures can be between about 80 and about 400 $m^2/g$ and is preferably greater than about 120 $m^2/g$, and typically about 200 $m^2/g$, which is significantly higher than the typical 100 $m^2/g$ observed for carbon nanotubes.

The high surface area and high porosity of the carbon nanostructures manufactured according to the present invention makes the carbon nanostructures useful as a support material for nanoparticle catalysts. Improved diffusion of reactants and/or electrons through the support material improves the efficiency with which substrates and electrons can be transferred to the catalytic surface of the nanoparticles. Consequently, the supported catalysts of the present invention perform better than nanoparticles supported on traditional supports such as carbon black.

As discussed in U.S. application Ser. No. 11/351,620, filed Feb. 9, 2006, the disclosure of which is incorporate herein, another use for carbon nanostructures manufactured according to the invention is as a solid particulate filler material added to a polymeric material (e.g., as a replacement for carbon black or carbon nanotubes). Preliminary testing of polymeric materials that were filled with carbon nanostructures according to the invention indicates that such filled polymeric materials have substantially reduced surface resistance compared to polymers filled with a comparable quantity of carbon black or carbon nanotubes.

V. Examples

The following examples provide formulas for making carbon nanostructures according to the present invention.

Example 1

Example 1 describes a method for making carbon nanostructures using solid catalytic nanoparticles. A 0.1 M iron solution was prepared using 2.24 g iron powder, 7.70 g citric acid, and 400 ml water. The iron-containing mixture was mixed in a closed bottle on a shaker table for 7 days, with brief interruption (e.g., 1-2 minutes) to open the container to vent hydrogen and allow air into the vapor space in the bottle. 100 ml of the iron solution was slowly added to a mixture of 6.10 g of resorcinol and 9.0 g of formaldehyde. 30 ml of ammonium hydroxide was added drop-wise with vigorous stirring. The pH of the resulting suspension was 10.26. The slurry was then cured at 80~90° C. (oil bath) for 3.5 hours to form an intermediate carbon nanostructure. The intermediate carbon nanostructure was collected by filtering and then dried in an oven overnight and then carbonized at 1150° C. under $N_2$ flow for 3 hour. The resulting composite nanostructure was refluxed in 5M $HNO_3$ for 6-8 hours and then treated with 300 ml of mixture ($H_2O/H_2SO_4/KMnO_4$, molar ratio=1:0.01:0.003) at 90° C. for 3 hours. Finally, the carbon nanostructures were washed with water, and dried in an oven for 3 hours. The procedure yielded 1.1 g of carbon nanostructure product (i.e., carbon nanorings and/or hollow multi-walled sphere-like structures).

The carbon nanostructures manufactured in Example 1 were then analyzed, first by TEM and later by SEM. TEM images of the nanorings from Example 1 are shown in FIGS. 1A-1C, 2A-2B and 3A-3B. As seen in the TEM images, the method of the present invention can produce carbon nanostructures that appear to be predominantly ring-shaped (i.e., "nanorings") and nanostructures of uniform size. The SEM images of FIGS. 4A-4B of the same carbon nanostructures indicate that the nanostructures are actually sphere-like (or spheroidal) rather than ring-shaped. Because the sphere-like multi-walled carbon nanostructures have a hole in the middle, as shown by the TEM images, they are not "nano onions", which are solid.

Example 2

In example 2, carbon nanostructures were manufactured in a process similar to Example 1, except that the intermediate carbon nanostructures were carbonized at 850° C. for 4 hours. The procedure yielded 1.04 g of carbon nanostructure product (i.e., sphere-like multi-walled carbon nanostructures and/or carbon nanorings).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for manufacturing carbon nanostructures, comprising:
   (i) forming a plurality of catalytic templating nanoparticles by:
      (a) reacting a plurality of precursor catalyst atoms with a plurality of organic dispersing agent molecules to form complexed catalyst atoms; and
      (b) allowing or causing the complexed catalyst atoms to form the templating nanoparticles;
   (ii) forming one or more intermediate carbon nanostructures by polymerizing a carbon precursor in the presence of the templating nanoparticles;
   (iii) carbonizing the intermediate carbon nanostructures to form a plurality of composite nanostructures; and
   (iv) removing the templating nanoparticles from the composite nanostructures to yield the carbon nanostructures, the carbon nanostructures having a BET specific surface area greater than about 120 $m^2/g$.

2. A method as defined in claim 1, wherein the catalyst atoms comprise at least one of iron, nickel, or cobalt.

3. A method as defined in claim 1, wherein the dispersing agent molecules are capable of bonding with the catalyst atoms and comprise at least one functional group selected from the group consisting of a hydroxyl, a carboxyl, a carbonyl, an amine, an amide, a nitrile, a nitrogen with a free lone pair of electrons, an amino acid, a thiol, a sulfonic acid, a sulfonyl halide, an acyl halide, and combinations thereof.

4. A method as defined in claim 1, wherein the dispersing agent molecules comprise at least one member selected from the group consisting of oxalic acid, malic acid, malonic acid, maleic acid, succinic acid, glycolic acid, lactic acid, glucose, citric acid, pectins, cellulose, ethanolamine, mercaptoethanol, 2-mercaptoacetate, glycine, sulfobenzyl alcohol, sulfobenzoic acid, sulfobenzyl thiol, sulfobenzyl amine, polyacrylates, polyvinylbenzoates, polyvinyl sulfate, polyvinyl sulfonates, polybisphenol carbonates, polybenzimidizoles, polypyridine, sulfonated polyethylene terephthalate, and combinations thereof.

5. A method as defined in claim 1, wherein the carbon precursor comprises a hydrothermally polymerizable organic substrate.

6. A method as defined in claim 5, wherein the hydrothermally polymerizable organic substrate comprises at least one of citric acid, acrylic acid, benzoic acid, acrylic ester, butadiene, styrene, or cinnamic acid.

7. A method as defined in claim 1, wherein the carbon precursor comprises at least one of resorcinol-formaldehyde-gel, phenol resin, melamine-formaldehyde gel, poly(furfuryl alcohol), or poly(acrylonitrile).

8. A method as defined in claim 1, wherein the templating nanoparticles are formed prior to being mixed with the carbon precursor.

9. A method as defined in claim 1, wherein carbonization is carried out at a temperature in a range of about 500° C. to about 2500° C.

10. A method as defined in claim 1, wherein at least a portion of the templating nanoparticles are removed from the composite nanostructure by etching with at least one of an acid or a base.

11. A method as defined in claim 1, further comprising placing metal catalyst particles on the carbon nanostructures.

12. A method as defined in claim 11, wherein the metal catalyst particles comprise at least one noble metal.

13. A method for manufacturing carbon nanostructures comprising:
(i) providing a plurality of solid catalytic templating nanoparticles consisting essentially of one or more types of metal catalyst atoms and optionally one or more types of organic dispersing agent molecules;
(ii) mixing the solid catalytic templating nanoparticles with a carbon precursor and polymerizing the carbon precursor in the presence of the solid catalytic templating nanoparticles to form a plurality of intermediate carbon nanostructures;
(iii) carbonizing the intermediate carbon nanostructures to form a plurality of composite nanostructures; and
(iv) removing the templating nanoparticles from the composite nanostructures to yield the carbon nanostructures, the carbon nanostructures having a BET specific surface area greater than about 120 $m^2/g$, the carbon nanostructures being composed of hollow multi-walled sphere-like carbon nanostructures, each multi-walled sphere-like carbon nanostructure being formed from multiple graphitic layers and having a single interior hole defining an interior diameter of the sphere-like carbon nanostructure.

14. A method as defined in claim 13, wherein the metal catalyst atoms comprise at least one of iron, nickel, or cobalt.

15. A method as defined in claim 13, wherein the dispersing agent molecules are capable of bonding with the catalyst atoms and comprise at least one functional group selected from the group consisting of a hydroxyl, a carboxyl, a carbonyl, an amine, an amide, a nitrile, a nitrogen with a free lone pair of electrons, an amino acid, a thiol, a sulfonic acid, a sulfonyl halide, an acyl halide, and combinations thereof.

16. A method as defined in claim 13, wherein the dispersing agent molecules comprise at least one member selected from the group consisting of oxalic acid, malic acid, malonic acid, maleic acid, succinic acid, glycolic acid, lactic acid, glucose, citric acid, pectins, cellulose, ethanolamine, mercaptoethanol, 2-mercaptoacetate, glycine, sulfobenzyl alcohol, sulfobenzoic acid, sulfobenzyl thiol, sulfobenzyl amine, polyacrylates, polyvinylbenzoates, polyvinyl sulfate, polyvinyl sulfonates, polybisphenol carbonates, polybenzimidizoles, polypyridine, sulfonated polyethylene terephthalate, and combinations thereof.

17. A method as defined in claim 13, wherein the carbon precursor comprises a hydrothermally polymerizable organic substrate.

18. A method as defined in claim 17, wherein the hydrothermally polymerizable organic substrate comprises at least one of citric acid, acrylic acid, benzoic acid, acrylic ester, butadiene, styrene or cinnamic acid.

19. A method as defined in claim 13, wherein the carbon precursor comprises at least one of resorcinol-formaldehyde-gel, phenol resin, melamine-formaldehyde gel, poly(furfuryl alcohol), or poly(acrylonitrile).

20. A method as defined in claim 13, wherein carbonization is carried out at a temperature in a range of about 500° C. to about 2500° C.

21. A method as defined in claim 13, further comprising placing metal catalyst particles on the carbon nanostructures.

22. A method as defined in claim 21, wherein the metal catalyst particles comprise at least one noble metal.

23. A method as defined in claim 1, wherein (a) further comprises mixing and reacting a ground state metal comprising the precursor catalyst atoms with the organic dispersing agent molecules to form the complexed catalyst atoms.

24. A method as defined in claim 1, wherein (a) further comprises adding a base to adjust the pH to above 8 and below about 13.

25. A method as defined in claim 13, wherein the solid catalytic templating nanoparticles are provided in an aqueous medium having pH greater than 8 and less than about 13.

26. A method as defined in claim 1, the carbon nanostructures being composed of hollow multi-walled structures, each multi-walled structure being formed from multiple graphitic layers.

27. A method for manufacturing carbon nanostructures, comprising:
forming a plurality of catalytic templating nanoparticles by:
reacting a plurality of precursor catalyst atoms with a plurality of organic dispersing agent molecules to form complexed catalyst atoms; and
allowing or causing the complexed catalyst atoms to form the templating nanoparticles;
forming a mixture comprising a carbon precursor and the plurality of catalytic templating nanoparticles, the catalytic templating nanoparticles comprising a catalytic metal, the mixture having a molar ratio of carbon precursor to catalyst metal atoms in a range of about 0.01:1 to about 100:1
causing or allowing the carbon precursor to polymerize in the presence of the templating nanoparticles to form a plurality of intermediate carbon nanostructures;
carbonizing the intermediate carbon nanostructures to form a plurality of composite nanostructures; and
removing the templating nanoparticles from the composite nanostructures to yield the carbon nanostructures, the carbon nanostructures having a BET specific surface area greater than about 120 $m^2/g$.

28. A method as defined in claim 27, the carbon nanostructures being composed of hollow multi-walled structures, each multi-walled hollow structure being formed from multiple graphitic layers.

* * * * *

UNITED STATES PATENT AND TRADEMARK OFFICE
CERTIFICATE OF CORRECTION

PATENT NO. : 7,718,155 B2
APPLICATION NO. : 11/539042
DATED : May 18, 2010
INVENTOR(S) : Zhang et al.

It is certified that error appears in the above-identified patent and that said Letters Patent is hereby corrected as shown below:

On the Title Page:
Item 56, OTHER PUBLICATIONS, Page 2, Right Hand Column, change "Ohtsuka, Yasui, et al., "Char-Nitrogen Functionality and Interactions Between the Nitrogen and Iron I the Iron-Catalyzed Conversion Process of Coal Nitrogen to $N_2$," Research Center for Organic Resources and Materials Chemistry, Institute for Chemical Reaction Science, Tohoku University, Sendai, Japan, pp. 1356-1362 (May 6, 1998)." to --Ohtsuka, Yasui, et al., "Char-Nitrogen Functionality and Interactions Between the Nitrogen and Iron in the Iron-Catalyzed Conversion Process of Coal Nitrogen to $N_2$," Research Center for Organic Resources and Materials Chemistry, Institute for Chemical Reaction Science, Tohoku University, Sendai, Japan, pp. 1356-1362 (May 6, 1998).--

Item 56, OTHER PUBLICATIONS, Page 2, Right Hand Column, change "Han, Sangjin, et al., "Simple Solid-Phase Synthesis of Hollow Graphitic Nanoparticles and their Appliation to Direct Methanol Fuel Cell Electrodes," *Adv. Mater.* 2003, 15, No. 22, Nov. 17, pp. 1922-1925." to --Han, Sangjin, et al., "Simple Solid-Phase Synthesis of Hollow Graphitic Nanoparticles and their Application to Direct Methanol Fuel Cell Electrodes," *Adv. Mater.* 2003, 15, No. 22, Nov. 17, pp. 1922-1925.--

Item 56, OTHER PUBLICATIONS, Page 2, Right Hand Column, change "Developing Application in Plastics, Nanotubes as a Conductive Additive in Elastomers; Hyperion Catalysis; hppt://www.fibrils.com/developing2.htm." to --Developing Application in Plastics, Nanotubes as a Conductive Additive in Elastomers; Hyperion Catalysis; http://www.fibrils.com/developing2.htm.--

Item 56, OTHER PUBLICATIONS, Page 3, Right Hand Column, change "Office Action dated Jan. 1, 2009 cited in U.S. Appl. No. 11/244,521." to --Office Action dated Jan. 21, 2009 cited in U.S. Appl. No. 11/244,521.--

In the Specifications:
Column 1
Line 41, change "temperature" to --temperature,--
Line 44, add --a-- before "carbon precursor"

Signed and Sealed this

Twelfth Day of October, 2010

David J. Kappos
*Director of the United States Patent and Trademark Office*

CERTIFICATE OF CORRECTION (continued)
U.S. Pat. No. 7,718,155 B2

Column 3
Line 2, change "thereof" to --thereof,--
Line 52, change "images but" to --images, but--
Line 53, change "hollow but irregular" to --hollow, but irregular,--
Line 66, change "particle" to --particles--

Column 4
Line 65, change "Van der Waals" to --van der Waals--

Column 5
Line 50, change "ion two" to --ion, two--

Column 6
Line 33, change "easy" to --easily--

Column 7
Line 62, change "embodiment" to --embodiment,--

Column 10
Line 5, change "shows" to --show--
Line 21, change "measure" to --measured--

Column 11
Line 9, change "incorporate" to --incorporated--

In the Claims:
Column 14
Line 44, Claim 27, after "100:1" insert --;--
Line 56, Claim 28, change "multi-walled hollow structure" to --hollow multi-walled structure--